United States Patent [19]

Pickard

[11] Patent Number: 5,029,514
[45] Date of Patent: Jul. 9, 1991

[54] NOZZLE HYDRAULIC ACTUATOR RING WITH COOLING FLOW

[75] Inventor: Gerald W. Pickard, Swindon Village, United Kingdom

[73] Assignee: Dowty Defence and Air Systems Limited, London, England

[21] Appl. No.: 353,247

[22] Filed: May 15, 1989

[30] Foreign Application Priority Data

May 18, 1988 [GB] United Kingdom ............... 8811698

[51] Int. Cl.⁵ .................... F15B 21/04; F02K 1/15
[52] U.S. Cl. ................................. 91/49; 91/51;
91/52; 91/189 A; 91/399; 91/408; 91/416;
239/265.33; 60/271; 60/912
[58] Field of Search ............... 60/271, 904, 912;
91/48, 51, 49, 52, 184, 189 A, 399, 402, 408,
409, 416, 431, 534, 536; 239/265.33, 265.39

[56] References Cited

U.S. PATENT DOCUMENTS

| | | | |
|---|---|---|---|
| 2,729,937 | 1/1956 | Hausmann | 60/271 X |
| 3,002,500 | 10/1961 | Diesing et al. | 91/52 X |
| 3,187,772 | 6/1965 | Hanson | 91/48 X |
| 3,699,847 | 10/1972 | Little | 60/912 X |
| 4,393,751 | 6/1983 | Kelley | 91/408 |
| 4,465,497 | 8/1984 | Howeth | 91/416 X |
| 4,594,936 | 6/1986 | Bacardit | 91/51 |
| 4,771,841 | 9/1988 | Uchida et al. | 91/51 X |
| 4,781,262 | 11/1988 | Nakamura et al. | 91/536 X |

FOREIGN PATENT DOCUMENTS

| | | | |
|---|---|---|---|
| 228900 | 7/1960 | Australia | 239/265.39 |
| 1226020 | 2/1960 | France | 91/411 |
| 1152228 | 5/1969 | United Kingdom . | |
| 1160624 | 8/1969 | United Kingdom . | |
| 2082800 | 3/1982 | United Kingdom . | |

Primary Examiner—Edward K. Look
Assistant Examiner—George Kapsalas
Attorney, Agent, or Firm—Young & Thompson

[57] ABSTRACT

A hydraulic actuator system, for use in an aircraft, and in which the servo fluid supply to the system is used to provide for the operation and cooling of the system. The system comprises a hydraulically operated piston mechanism including at least one hydraulically operated piston, a servo vluid input to the system, which is connected in a ring main to a first side of the hydraulically operated piston, a servo fluid output from the system, which is connected in a ring main to a second side of the hydraulically operated piston, a variable restrictor arrangement which provides an interface between the servo fluid input ring main and the servo fluid output ring main, and a restrictor arrangement positioned in the servo fluid output side of the system. The position of the piston of the hydraulic piston and the adjustment thereof, are controlled by the restriction applied on the system by the variable restrictor arrangement.

6 Claims, 1 Drawing Sheet

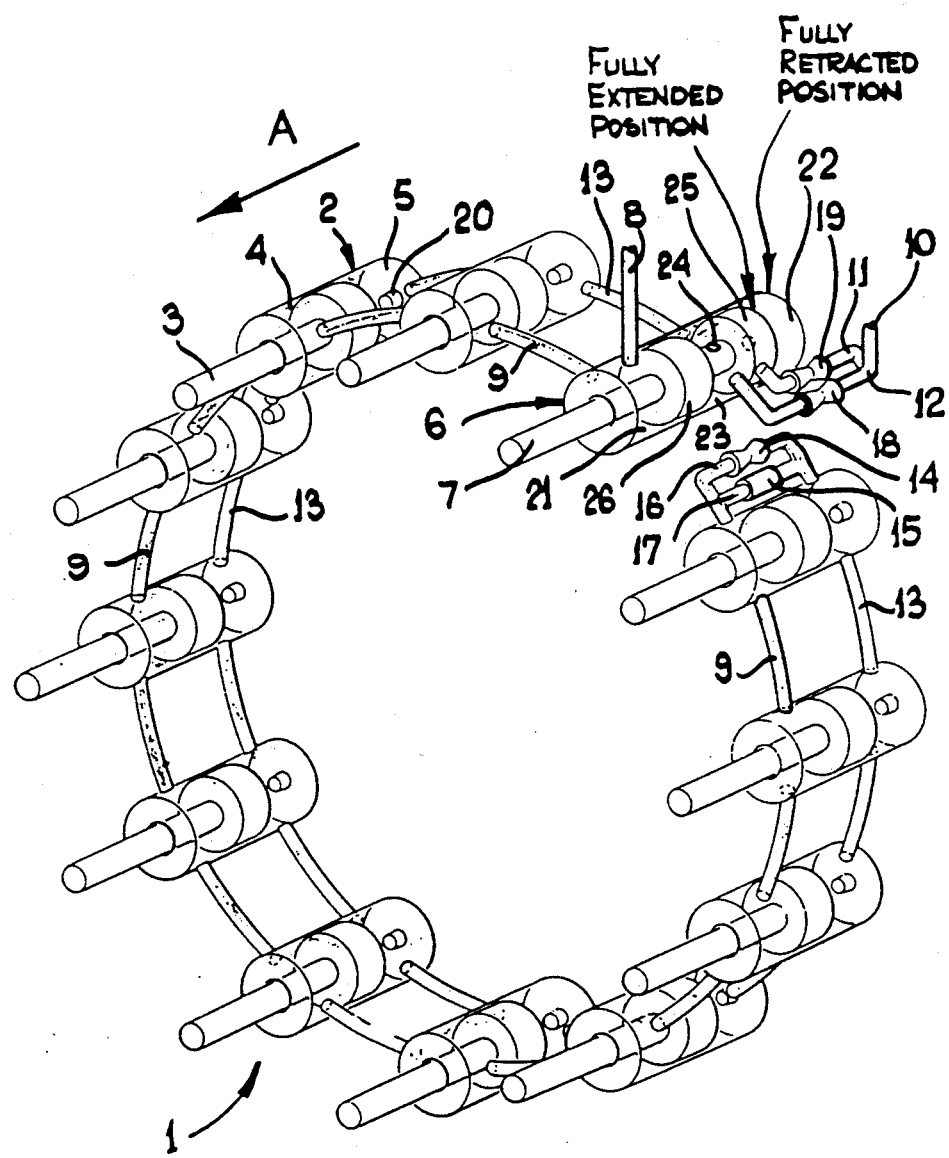

NOZZLE HYDRAULIC ACTUATOR RING WITH COOLING FLOW

BACKGROUND OF THE INVENTION

This invention relates to a hydraulic actuator systems, and in particular, to hydraulic actuator systems which are adapted for use in hostile environments, such as those experienced with aircraft.

Presently known hydraulic actuator systems which are suitable for use in conjuction with aircraft, incorporate operating and cooling systems over which there is no control of the fluid flow therethrough. The lack of control over the fluid flow through the system causes large problems with designing an actuator system having the desired minimum cooling flow under all operating/flight conditions throughout the aircraft.

SUMMARY OF THE INVENTION

The present invention is concerned with providing an actuator system, having a readily controllable flow of fluid through the operating and cooling systems, and thereby alleviating or at least reducing the above mentioned problem.

In accordance with the present invention a hydraulic actuator system in which the servo fluid supply to the system is used to provide for the operation and cooling of the system, comprises:
a hydraulically operated piston mechanism including at least one hydraulically operated piston means;
a servo fluid input to the system, which is connected in a ring main to a first side of the hydraulically operated piston means;
a servo fluid output from the system, which is connected in a ring main to a second side of the hydraulically operated piston means;
a variable restrictor arrangement which provides an interface between the servo fluid input ring main and the servo fluid output ring main; and
a restrictor arrangement positioned in the servo fluid output side of the system;
wherein the position of the piston of the hydraulic piston means therein, and the adjustment thereof, are controlled by the restriction applied on the system by the variable restrictor arrangement.

With this arrangement of the system, the rate of flow of hydraulic fluid through the system is controlled by the relative configuration of the restrictor arrangement and the variable restrictor arrangement. In practice the configuration of the restrictor arrangement relative to the variable restrictor arrangement is dependent on the amount of actuation in the system.

It can be easily appreciated from this statement of invention that an actuator system made in accordance with the present invention, uses the same flow system to control the operation, and the cooling of the actuator system.

Further, the actuator system may be adjusted between a fully extended position and a fully retracted position by simply adjusting the restriction/throttling placed on the system by the variable restrictor arrangement.

Preferably, at least one of the hydraulically operated piston means provided includes a master/controlling hydraulically operated piston means.

Each of the hydraulically operated piston means may comprise a simple landed piston in a chamber, the position of which piston in the chamber is adjusted by a pressure differential acting across the piston, i.e. a pressure differential between the first side and the second side of the hydraulically operated piston means.

Preferably, the restrictor arrangement is a fixed restrictive effect restrictor arrangement. However, alternatively the restrictor may include a variable restrictor.

The restrictor arrangement may be positioned anywhere in the output side of the system, however preferably is at the output from the system.

Preferably, the actuator system further includes a means to vary the fluid output flow rate from the actuator system. In this way the output fluid flow rate from the system, at both of its operational positions, is easily controllable.

Preferably, the means to vary the fluid output flow rate from the actuator system is incorporated into the restrictor means. Therefore, the restrictor arrangement preferably comprises a dual line output arrangement, each of which includes a fixed restrictor, and one of which is closed off when the actuator system is fully extended. Most preferably, this is achieved by one of the, or the, lands in the master hydraulically operated piston means as the piston moves to the fully extended position.

The variable restrictor arrangement, preferably, comprises a solenoid valve and restrictor arrangement.

The variable restrictor arrangement may be constructed so that the actuator system may be set to any of two or more positions.

An actuator system of this kind may be used in any number of situations, and may be called upon to have a small or large degree of piston travel, and may be used so as to enable very accurate control of the piston travel.

The present invention may be used in a large number of environments, and is particularly suited to use in environments where cooling and heat management need to be considered, for example, on rocket turbine or jet powered craft such as aircraft, and spacecraft.

This type of actuator system is particularly suited to use in circumstances where the system is subjected to very harsh and hostile conditions. For example, conditions under which the system itself may be subjected to temperatures in excess of 200° C. This is typical of the conditions a variable air flow nozzle system for a modern jet engined aircraft would be subjected too, and the exact conditions this actuator system has been designed for.

The invention also includes a jet engine which includes an actuator system in accordance with the present invention.

The invention further includes a jet engine which includes an air flow control arrangement including an actuator system in accordance with the present invention.

The invention further includes an aircraft incorporating an actuator system made in accordance with the present invention.

The invention further includes an aircraft incorporating a jet engine incorporating an actuator system in accordance with the present invention.

BRIEF DESCRIPTION OF THE DRAWINGS

The invention will now be described, by way of example, with reference to the accompanying drawings, in which:

FIG. 1 shows a schematic representation of an actuator system made in accordance with the present invention.

DETAILED DESCRIPTION OF THE PREFERRED EMBODIMENTS

Now referring to the drawings, an hydraulic actuator system 1 made in accordance with the present invention includes:

eleven hydraulic piston means 2, each of which has a piston 3 that divides the piston means into a first stage 4 and a second stage 5;

a master hydraulic piston means 6 which has a double landed piston 7 which divides the master hydraulic piston means 6 into three stages, the first stage 21 and second stage 22 of which correspond to the first and second stages of the hydraulic piston means 2 and the second stage 22 and third stage 23 of which are interconnected by an annular means 24;

a fluid input line 8 to the master hydraulic piston means 6;

a fluid input ring main line 9 which connects the first stages 4, 21 of all the hydraulic piston means 2 and the master hydraulic piston means 6 in series;

a fluid output line 10, having two branch output lines 11, 12 from the master hydraulic piston means 6;

a fluid output ring main line 13 which interconnects the second stages 5, 22 of all the hydraulic piston means 2 and the master hydraulic piston means 6 in series;

a cooling flow restrictor 14, and a solenoid valve 15 positioned in respective branch lines 16, 17 and which effectively separates the fluid input ring main line 9 and the fluid output ring main line 13; and two restrictors 18, 19 placed one in each of the two branch output lines 11, 12 and of differing sizes.

This particular system is designed and constructed to have two positions of operation retracted and extended. FIG. 1 of the drawings illustrates the system in a fully extended position, and, also, shows the relative positions of the retracted and extended positions for the actuator system 1.

In one of the possible uses envisaged for this actuator system, i.e. in conjunction with the nozzle of a jet engine, for fine control thereof, the total distance of travel of the piston between the extended and retracted positions may be as little as 1 cm.

Therefore, it can be easily appreciated that such a system is very accurate in the control which it provides.

In this particular usage the system will be regularly subjected to operating temperatures in excess of 200° C. Under which conditions the fluid temperatures within the sytem may rise above 200° C, hence a cooling system is required. An actuator in accordance with the present invention provides the necessary cooling system with efficient use of components and space.

The two groups of restrictors, i.e. solenoid valve 15 with cooling flow restrictor 14, and the two restrictors 18, 19 are designed, and sized so that they fully interact with each other to provide the system with the desired throughout of fluid in both the fully retracted and fully extended positions of the system. Although, it may not be possible, due to the particular system design criteria, to provide the system with identical fluid throughputs for both the retracted and extended positions, these throughputs as far as is possible are substantially identical.

In the fully retracted position, each of the pistons 3 of the hydraulic piston means and the piston 7 of the master hydraulic piston means abuts against a stop 20 provided in the respective piston means.

In this position the solenoid valve 15 is closed and the cooling flow restrictor 14 provides maximum throttling across the input ring main line 9 and output ring main line 13 interface. Thereby the pressure differential across the input to output of the system is at its greates and the pistons 3 and 7 are forced to contact the stops 20.

Further, in this position both of the branch output lines 11, 12 are open to the third stage 23 of the master hydraulic piston means and output flow occurs via both of these lines.

Now, when the actuator system is to be moved from the retracted position to the extended position, the solenoid valve 15 is activated to open, and thereby, the pressure drop/differential between the input ring main line 9 and the output ring main line 13 is reduced to a minimum. Effectively, this causes the pistons of the hydraulic piston means 2 and master hydraulic piston means 6 to move in direction A and away from the stops 20. Further, this significantly increases the fluid flow throughput of the actuator system, which means in order to attain an adequate balance this has to be brought down to an acceptable level.

Once, the hydraulic piston means 2 and master hydraulic piston means 6 of the system have reached the respective positions, as shown in FIG. 1, in which one of the lands 25 of the double landed piston 7 closes off the output branch line 11. This in turn, closes down the effective flow area for output flow of fluid from the system and with the restrictor 18 in line 12 being correctly sized reduces the fluid flow throughout of the system to the desired level.

Thereby, the system in accordance with the present invention in addition to providing an accurate control means also provides effective cooling for a system which may be exposed to very hot and hostile environments, e.g. hot gases in a turbulent gas stream, i.e. the fuel nozzle on a jet aircraft.

In one particular example of an actuator system in accordance with the present invention the following characteristics were typical for the system:

| | |
|---|---|
| Flow rate through the system in retracted mode = | 1.0 liters/min |
| Flow rate through the system during change from retracted to extended mode = | 4.0 liters/min |
| Flow rate through the system in extended mode = | 1.8 liters/min |
| Time for change (retracted <=> extended) = | 1 sec |
| Solenoid/Cooling flow Restrictor Ratio = $\dfrac{\text{Flow number extended}}{\text{Flow number retracted}}$ | 10:1 |
| Flow number restrictor 18 (opened in both extended/retracted mode) | $0.4 \dfrac{\text{Gph}}{\sqrt{\text{psi}}}$ |
| Flow number restrictor 19 (closed off in extended mode) | $0.6 \dfrac{\text{Gph}}{\sqrt{\text{psi}}}$ |

I claim:

1. A hydraulic actuator system in which the servo fluid supply to the system is used to provide for the operation and cooling of the system, comprises:
   a hydraulically operated piston arrangement including a plurality of hydraulically operated piston devices including at least one piston movable within one of said hydraulically operated piston devices which provides a master/controlling hydraulically operated piston means;

a servo fluid input to the system, which is connected in a ring main to a first side of the hydraulically operated piston means;

a servo fluid output from the system, which is connected in a ring main to a second side of the hydraulically operated piston means;

a variable restrictor arrangement which provides an interface between the servo fluid input ring main and the servo fluid output ring main;

a restrictor arrangement positioned in the servo fluid output side of the system; and means to vary the fluid output flow rate from the actuator system which comprises a dual line output arrangement, each of which lines include a fixed restrictor, and one of which lines is closed off when the actuator system is fully extended;

wherein the position of the piston of the hydraulic piston means therein, and the adjustment thereof, are controlled by the restriction applied on the system by the variable restrictor arrangement.

2. A hydraulic actuator system as claimed in claim 1, wherein the means to vary the fluid output flow rate from the actuator system is incorporated into the piston means.

3. A hydraulic actuator system as claimed in claim 2, wherein the means to vary the fluid output flow rate from the actuator system is achieved by at least one land in the master hydraulically operated piston means as the piston moves to the fully extended position.

4. A hydraulic actuator system as claimed in claim 1, wherein the restrictor arrangement is a fixed restrictive effect restrictor arrangement.

5. A hydraulic actuator system as claimed in claim 1, wherein the restrictor arrangement includes a variable restrictor.

6. A hydraulic actuator system as claimed in claim 1, wherein the variable restrictor arrangement comprises a solenoid valve and restrictor arrangement.

* * * * *